Oct. 12, 1965 P. W. JOY 3,210,891
VIBRATORY APPARATUS
Filed Dec. 19, 1962 6 Sheets-Sheet 1

INVENTOR.
PAUL W. JOY
BY
*R. W. Brownell*
ATTORNEY

INVENTOR.
PAUL W. JOY
BY
K.W. Brownell
ATTORNEY

Oct. 12, 1965  P. W. JOY  3,210,891
VIBRATORY APPARATUS
Filed Dec. 19, 1962   6 Sheets-Sheet 4

INVENTOR.
PAUL W. JOY
BY
*H.W. Brownell*
ATTORNEY

United States Patent Office 3,210,891
Patented Oct. 12, 1965

3,210,891
VIBRATORY APPARATUS
Paul W. Joy, Grand Island, N.Y., assignor to The Carborundum Company, Niagara Falls, N.Y., a corporation of Delaware
Filed Dec. 19, 1962, Ser. No. 245,789
11 Claims. (Cl. 51—163)

This invention relates to an improved vibratory apparatus and more particularly to a vibratory apparatus wherein the element to be vibrated is isolated from the stationary support by resilient mounts.

Vibratory apparatus has found application in various manufacturing processes such as the finishing of metallic parts by loose abrasives. The parts and loose abrasives are placed in a receiver or a chamber in the element to be vibrated. The chamber is then subjected to a vibratory movement so that the loose abrasives finish the parts by an abrasive or rubbing action. Burrs, rough edges and the like may be removed from the parts and the parts may be polished in this manner. The type of vibratory motion to which the material in the chamber is subjected determines to a great extent the efficiency of the process. It has been found where the material is subjected to a truly orbital vibratory motion, a more efficient finishing is obtained.

Considerable difficulty has been encountered in obtaining a truly orbital vibratory motion with an unbalanced eccentric weight type vibrator. The principal difficulty encountered is the connecting means between the receiver and the stationary support portion of the vibratory apparatus. It has been the practice in the past to either freely suspend the material receiver from overhead flexible means or to support the receiver in such a manner that its vibratory motion is hindered in a given direction so that truly orbital vibratory motion is not obtained.

With my improved vibratory apparatus, it is now possible to obtain a truly orbital motion in a manner not heretofore taught. I have found, by securing the unbalanced mass to the receiver and isolating both the receiver and the unbalanced mass from the stationary support, that I obtain truly orbital vibratory motion. The mountings for the receiver are flexible mountings so positioned that the mountings are on a circle which has substantially the same center as that of the rotating unbalanced mass. I have further found, with this arrangement, that the vibrations are absorbed by the flexible mountings and are not transmitted to the stationary support portion of the apparatus.

My improved apparatus readily lends itself to the use of a receiver having a plurality of chambers with open top portions. The chambers may be so arranged on the receiver that the center of gravity of the material in the chamber is on substantially the same line as the center of gravity of the rotating eccentric masses. The use of multiple chambers further provides vibratory apparatus that may be employed in practicing numerous continuous multi-step processes, such as cleaning and polishing various parts, or washing and coating such parts. In the past, it has been the practice to accomplish such multi-step processes in a stepwise batch fashion.

Accordingly, the principal object of this invention is to provide vibratory apparatus which imparts substantially orbital vibratory movement to the material receiver.

Another object of this invention is to isolate the receiver from the stationary portion of the vibratory apparatus by means of flexible mounts which are spaced radially and have substantially the same center as the unbalanced mass that provides vibratory movement for the receiver.

A further object of this invention is to provide vibratory apparatus wherein the center line of the rotating mass is substantially on the center line of the mounting circle.

A further object of this invention is to provide vibratory finishing apparatus which includes a plurality of working chambers in the receiver element that is vibrated.

With the above and other objects in view which will appear when the description proceeds, features of the invention reside in the combination of parts and the details of construction hereinafter described and claimed, it being understood that changes in the precise embodiment of the invention herein disclosed may be made within the scope of what is claimed without departing from the spirit of the invention.

In the accompanying drawings, to be taken as part of this specification, there is clearly and fully illustrated the preferred embodiment of this invention in which drawings.

Figure 1:
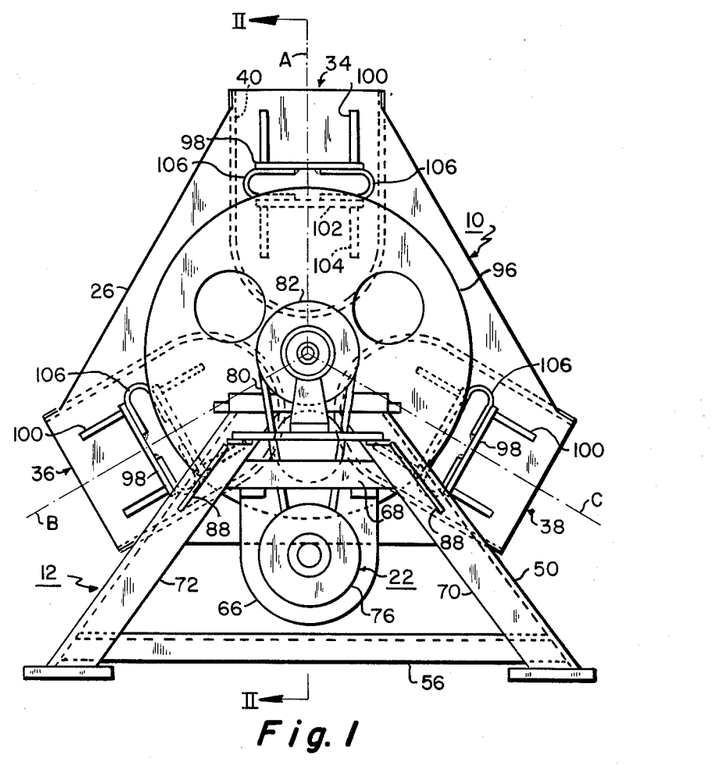
FIGURE 1 is a view in end elevation illustrating my improved vibratory finishing apparatus.
Figure 2:
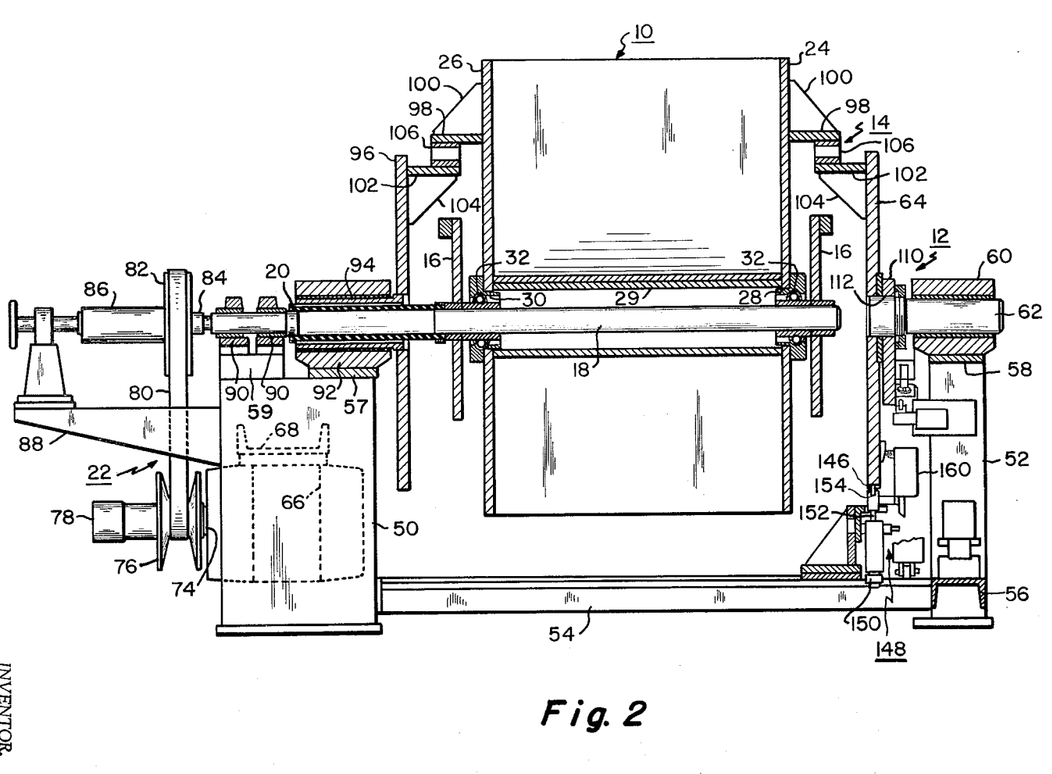
FIGURE 2 is a view in side elevation and in section taken along the line II—II of FIGURE 1.
Figure 3:
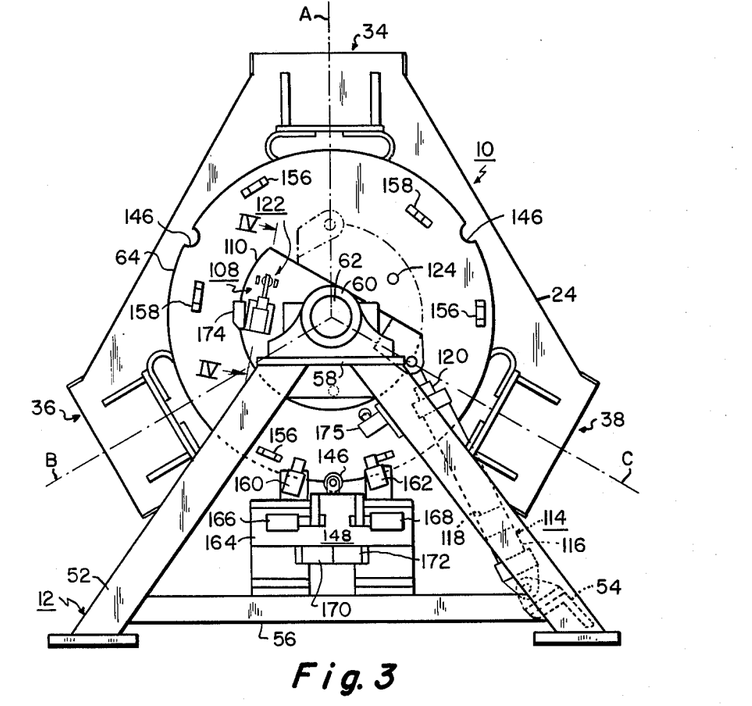
FIGURE 3 is another view in end elevation of my improved vibratory apparatus taken from the opposite end and illustrating the receiver positioning means.

Referring to the drawings and particularly to FIGURES 1, 2 and 3, there is illustrated my improved vibratory apparatus having a receiver for the material to be treated generally designated by the numeral 10. The receiver 10 is supported from the stationary support portion of my vibratory apparatus generally designated by the numeral 12. A plurality of resilient mounts 14 insulate the receiver 10 from the stationary support portion 12. Vibratory motion is imparted to the receiver 10 by the eccentric weights 16 as will hereinafter be described. The eccentric weights 16 are nonrotatably secured to a shaft 18 and a flexible coupling 20 isolates the shaft 18 from the stationary support portion 12. The receiver 10 is thus isolated from the stationary portion 12, and the eccentric weights 16 and the shaft 18 are also isolated therefrom by means of the flexible coupling 20. Drive means generally designated by the numeral 22 rotates shaft 18 and eccentric weights 16 through coupling 20 to thereby impart vibratory motion to receiver 10. The receiver 10, being isolated from the stationary support portion 12 by means of the flexible mounts 14 is free to vibrate in a substantially orbital path.

As viewed in both FIGURES 1 and 3, the mounts 14 are radially spaced from the axis of shaft 18 in a radiosymmetric manner and are substantially equidistant from the axis of shaft 18. The above general arrangement of receiver 10, eccentric weights 16 and resilient mounting means 14 relative to stationary support portion 12 now makes it possible with my improved vibratory apparatus to impart a truly vibratory motion to the receiver 10.

Referring in greater detail to FIGURES 1, 2 and 3, the receiver 10 has a pair of triangular plate like end walls 24 and 26 which are maintained in spaced parallel relation by a tubular shaft receiver 29. The end walls 24 and 26 have central apertures 28 and 30 therethrough which are aligned with tubular shaft receiver 29. Secured in the apertures 28 and 30 are bearings 32. Shaft 18 extends through bearings 32 and shaft receiver 29 and is arranged to rotate relative to receiver 10. The receiver 10 has three material receiving chambers 34, 36 and 38. The respective material receiving chambers are of substantially similar construction and similar numerals will designate similar portions of each of the chambers. The receiver end walls 24 and 26 serve as end walls for the chambers 34, 36 and 38. Each of the chambers has a U-shaped plate 40 which forms the side walls and the bottom wall of the chamber. The ends of the U-shaped plates 40 are secured to the end walls 24 and 26 to thereby form the respective chambers. For convenience, the vertical axes of the respective material receiving chambers are indicated in FIGURES 1 and 3 by the letters A, B and C and the dash-dot lines in these figures.

Figures 6, 7:
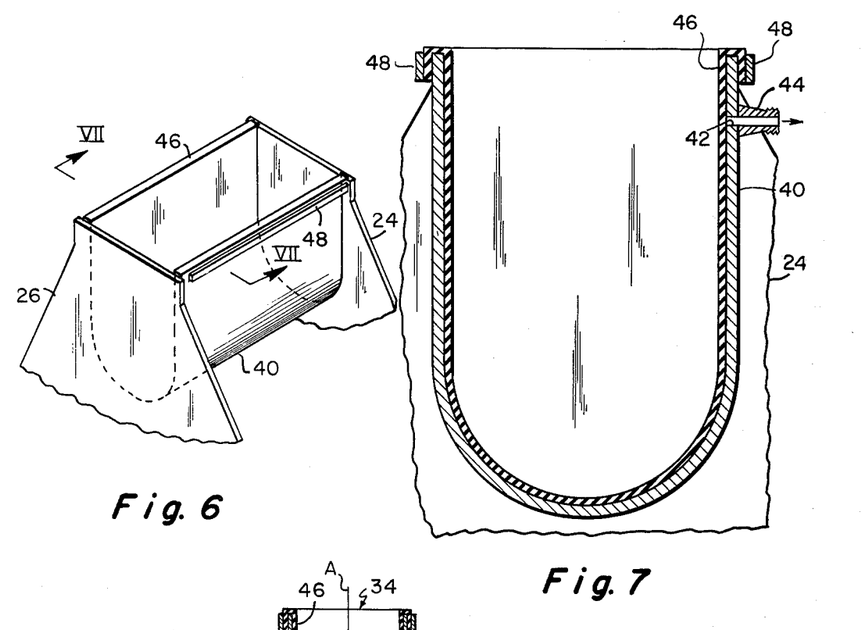
FIGURE 6 is a perspective view of one material receiving chamber suitable for use with my improved vibratory apparatus.
FIGURE 7 is a view in end elevation and section taken along the line VII—VII of FIGURE 6 illustrating a means of maintaining the flexible lining within the receiver.

Details of a chamber suitable for use in my vibratory apparatus are illustrated in FIGURES 6 and 7. The U-shaped plate 40 forming the side and bottom walls of the chamber is secured to the respective receiver end walls 24 and 26 in any suitable manner. The wall 40 has an aperture 42 therein and a valve device 44 secured in overlying relation with aperture 42. A flexible shock absorbing resilient liner 46 is positioned in the chamber and is secured in airtight relation with wall 40 by means of the strap members 48. With the chamber illustrated in FIGURES 6 and 7 air is evacuated from between the liner 46 and wall 40 and the liner is thus maintained in abutting relation with the inner surface of the wall 40 when the receiver 10 is vibrated. Alternatively, the liner 46 could also be vulcanized to the inside surface of the chamber wall 40.

The stationary support portion of my vibratory apparatus generally designated by the numeral 12 includes a pair of upright standards 50 and 52 (FIG. 2). Cross members 54 maintain the upright standards 50 and 52 in spaced relation to each other. Both upright standards 50 and 52 have a cross member 56 adjacent their lower portion, standard 52 having a horizontal top support plate 58, and standard 50 having two horizontal top plates 57 and 59. A journal bearing 60 is secured to the top support plate 58 of upright standard 52 (FIGS. 2 and 3). A stub shaft 62 is journaled for rotation in bearing 60. A circular plate like carrier member 64 is fixed to an end of the stub shaft 62 and is rotatable therewith.

A channel 68 is secured to the other upright standard 50 (FIGS. 1 and 2) and has a driving motor 66 suspended therefrom. The driving motor 66 has a shaft 74 to which a variable pitch drive pulley 76 is rotatably secured. A conventional spring type pitch changing device 78 is connected to pulley 76 and is operable to change the pitch of the pulley 76. A V belt 80 extends around drive pulley 76 and a driven pulley 82. The driven pulley 82 is mounted on a shaft 84 and has a pitch adjustment means 86 associated therewith. The pitch adjustment means is operable to vary the pitch of pulleys 82 and 76 to change the rate at which shaft 84 rotates relative to motor shaft 74. The pitch adjustment means 86 is supported on an outwardly extending support 88 that is suitably secured to upright legs 70 and 72 of standard 50. The support plate 59 on upright standard 50 has bearings 90 secured thereto and stub shaft 84 is rotatably supported in the bearings 90.

A second journal bearing 92 is secured to the support plate 57 on upright standard 50 and is arranged to rotatably support a hollow shaft 94. The shaft 94 is secured at one end to a second carrier member 96 and is rotatable therewith. Extending through the hollow shaft 94 is the flexible coupling 20 which connects the stub shaft 84 with shaft 18. Suitable bearings are positioned between flexible coupling 20 and the inner surface of hollow shaft 94 and between the outer surface of hollow shaft 94 and the journal bearing 92. The flexible coupling 20, driven by stub shaft 84 is thus free to rotate relative to the hollow shaft 94 and hollow shaft 94 is also free to rotate relative to journal bearing 92.

The receiver end walls 24 and 26 have outwardly extending mounting plates 98 secured thereto. Gussets 100 maintain the mounting plates 98 in fixed position relative to the respective end walls 24 and 26. The mounting plates 98 are so positioned relative to end walls 24 and 26 that they extend substantially the same distance on opposite sides of the material receiving chamber vertical axes A, B and C and substantially perpendicularly thereto. This is shown in FIGURE 1. Extending inwardly from the respective carrier members 64 and 96 are other mounting plates 102 which are in substantially parallel spaced relation with corresponding mounting plates 98 on receiver end walls 24 and 26. Gusset plates 104 maintain the mounting plates 102 in fixed position relative to respective carrier members 64 and 96.

The receiver 10 is supported by the carrier members 64 and 96 and resilient mounting means generally designated by the numeral 14 are positioned between the respective mounting plates 98 associated with the receiver 10 and mounting plates 102 associated with the carrier members 64 and 96. In the embodiment illustrated in FIGURES 1, 2 and 3, the resilient mounting means are U-shaped spring members 106. The spring members 106 are suitably secured to the mounting plates 98 and 102 as by welding or the like.

Figure 5:
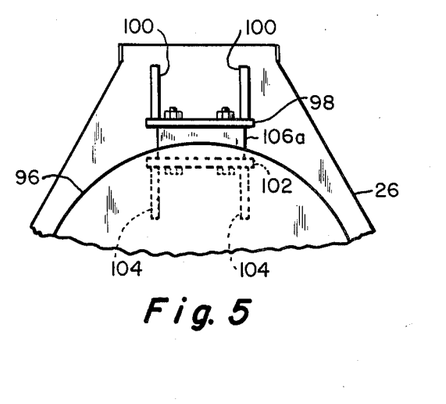
FIGURE 5 is a fragmentary view of the mounting means wherein a rubber type of mount is employed.

In FIGURE 5, there is illustrated another resilient mounting means indicated by the numeral 106a. In this figure, the resilient mounting means is formed from a block of rubber having a suitable durometer hardness to resiliently support the receiver 10 and to absorb the vibratory motion transmitted from the eccentric weights 16 through the receiver 10 to the stationary support portion 12. The rubber resilient mounting means 106a may be secured to the respective mounting plates 98 and 102 by a suitable adhesive or by a plurality of bolts extending through both the mounting plates and the rubber resilient mounting block 106a.

With the above described construction, the receiver 10 is resiliently supported by the stationary support 12 and is isolated therefrom. The carrier members 64 and 96 which form a part of the stationary support 12 are rotatable relative to the upright standards 50 and 52. The manner by which the carrier members 64 and 96 are associated with the receiver 10 permits the receiver 10 to rotate with the carrier members 64 and 96 to change the respective position of the material receiving chambers 34, 36 and 38. For example, when the carrier members 64 and 96 rotate in a clockwise direction as viewed in FIGURE 3, the chamber 36 will rotate to the respective position illustrated by chamber 34 in that figure. In turn, the chamber 34 will rotate to the position indicated by chamber 38 in that figure.

Figure 4:
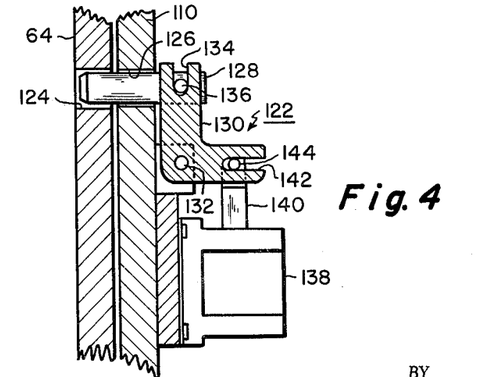
FIGURE 4 is a fragmentary view in section taken along the line IV—IV in FIGURE 3 illustrating a portion of the positioning means.

The carrier members 64 and 96 are maintained in a fixed position relative to upright standards 50 and 52 by a positioning means generally indicated by the numeral 108. A semicircular index plate 110 having an aperture 112 therethrough is positioned on stub shaft 62 (see FIG. 3) in rotatable relation therewith. A servo mechanism 114 has a cylinder 116 pivotally secured at its lower end to cross member 54 (see FIG. 3). Within the cylinder 116, there is a piston 118 having a rod 120 extending therefrom. The piston rod 120 is pivotally secured to the index plate 110 so that upon downward movement of piston 118 in cylinder 116, the index plate 110 rotates in a clockwise direction from the position indicated in dotted lines in FIGURE 3 to the position indicated in solid lines. The carrier member 64 is connected to index plate 110 for rotation therewith by an index pin assembly generally designated by the numeral 122. Detailed construction of the index pin assembly 122 is illustrated in FIGURE 4. The plate 110 has an aperture 126 through which index pin member 128 extends. Carrier member 64 has a plurality of apertures 124 which are so arranged that in certain positions of index plate 110, the aperture 126 is aligned with a selected aperture 124 in carrier member 64.

As illustrated in FIGURE 4 the index plate 110 has an L-shaped member 130 pivotally secured thereto by means of a pin connection 132. The L-shaped member 130 has slotted portions 134 arranged to receive cross pins 136 which extend laterally from index pin member 128. With this arrangement, the index pin 128 may be inserted or withdrawn from apertures 124 in carrier member 64 by the pivotal movement of L-shaped member 130 about pin 132. A solenoid 138 schematically illustrated in FIGURE 4 is secured to index plate 110 and has an actuator arm 140 extending upwardly therefrom. The L-shaped member 130 has a second slotted portion 142 and solenoid arm 140 has a cross pin member 144 extending into the slotted portions 142 to pivotally connect the solenoid arm to the L-shaped member 130. Thus, as the arm 140 moves inwardly into the solenoid 138 by means of the previously described pivotal connections, the index pin 128 is withdrawn from apertures 124 in carrier member 64.

Referring again to FIGURE 3, the carrier member 64 has a plurality of semicircular slots 146 around its outer periphery. The slots 146 are arranged to mate with a lock cylinder generally designated by the numeral 148 as shown in FIGURES 2 and 3.

The lock cylinder generally designated by the numeral 148 is shown in FIGURE 2 and includes a solenoid 150 which has an actuator arm 152 extending upwardly therefrom. The arm 152 has a wheel 154 secured to the end thereof in rotatable relation therewith. The wheel 154 is arranged to be positioned in the semicircular slots 146 of carrier 64. The arm 152 is spring loaded into an extended position and upon actuation of solenoid 150, arm 152 is moved downwardly and wheel 154 is withdrawn from the respective slot 146 in carrier member 64.

The carrier member 64 has a plurality of cam-like switch actuators 156 and 158 positioned on opposite sides of the semicircular slots 146. The switch actuators 156 and 158 are arranged to actuate limit switches 160 and 162. The limit switches 160 and 162 are secured to a housing 164 which is supported by the cross member 56 of upright standard 52 (see FIG. 3). The limit switches 160 and 162 are so spaced from the carrier member 64 that switch actuators 156 and 158 actuate the respective switches as the carrier member 64 is rotated. Also associated with the lock cylinder 148 are other limit switches 166 and 168.

Solenoids 170 and 172 are also associated with the lock cylinder 148 and their function will be later described. The index plate 110 has a cam-like switch actuator 174 secured to its outer edge. The actuator 174 is arranged to actuate a limit switch 175 secured to a leg of upright standard 52.

Figure 10:
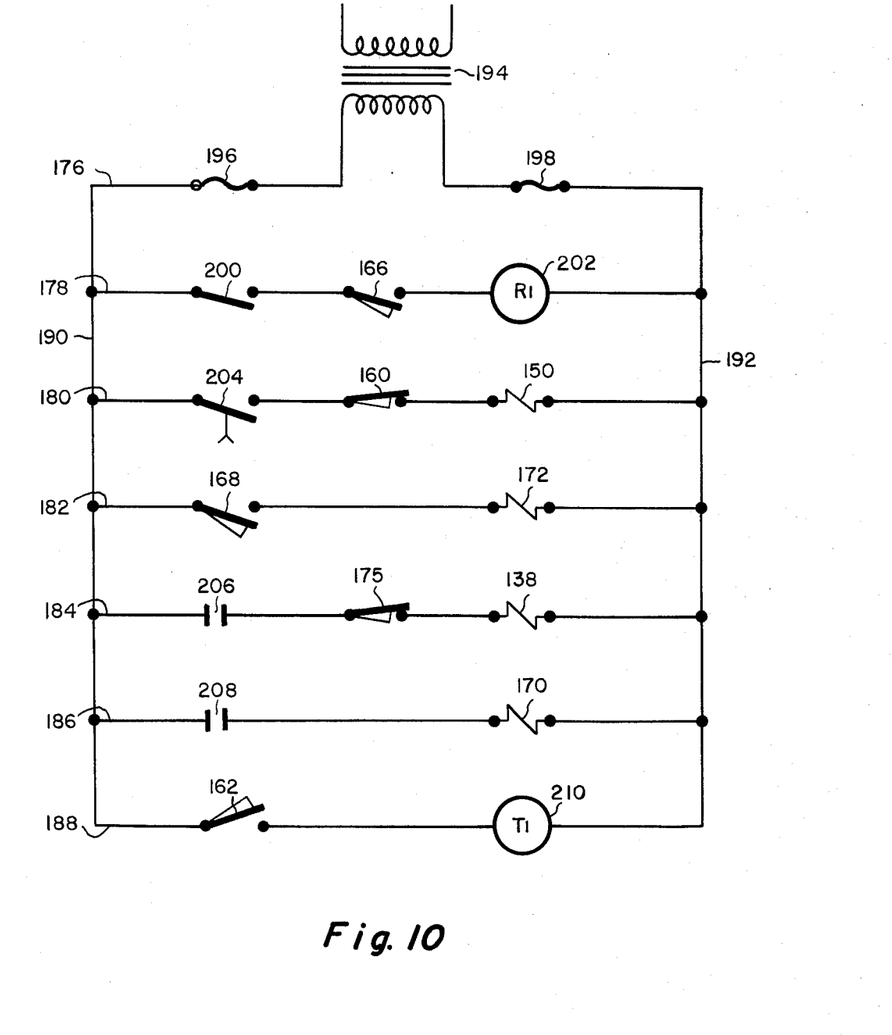
FIGURE 10 is a circuit diagram of the controls employed to change the relative position of the three material receiving chambers.

The electric circuit associated with the positioning means for the receiver 10 is schematically set forth in FIGURE 10. The horizontal wires indicate separate control circuits and are numbered consecutively as circuits 176 to 188 inclusive. The base wires 190 and 192 provide connecting wires for the circuit. Numeral 194 indicates a transformer arranged to provide current having a voltage of about 110 volts from a source of higher alternating current. The circuit 176 includes a pair of conventional fuses 196 and 198 associated with transformer 194. Circuit 178 includes a toggle switch 200, limit switch 166 and a timer relay 202. Circuit 180 includes switch 204 which is actuated by means of timer relay 202, limit switch 160 and solenoid 150 which is associated with lock cylinder 148. Circuit 182 includes limit switch 168 and solenoid 172. Circuit 184 includes a timer actuated switch 206, limit switch 175 and solenoid 138 associated with index pin 128. Circuit 186 includes a timer actuated switch 208 and solenoid 170 associated with lock cylinder 148. Circuit 188 includes limit switch 162 and a timer 210 which actuates switches 206 and 208.

Referring to the circuit FIGURE 10, and FIGURES 2, 3 and 4, the relative position of the chambers 34, 36 and 38 is changed as follows. The index plate 110 is in the position indicated in dotted lines in FIGURE 3. Both the lock cylinder 148 and the index pin 128 are in an engaged position. That is, the wheel 154 on the lock cylinder 148 engages a slot 146 in carrier member 64. The index pin 128 (FIGURE 4) extends into the appropriate aperture 124 in carrier member 64. To start the sequence of operation, toggle switch 200 is closed, limit switch 166 being closed because lock cylinder 148 is in engaged position, and thus timer 202 is energized to begin the time cycle. At the end of the time cycle, timer 202 closes switch 204 in circuit 180. Limit switch 160 is normally closed as indicated in FIGURE 3 by means of its relative spacing with switch actuator 156.

Thus, as timer 202 completes the cycle, it closes switch 204 in circuit 180 to energize solenoid 150 to retract arm 152 and wheel 154 from the semicircular slot 146 in carrier member 64. When lock cylinder 148 is retracted, switch 168 is closed and solenoid 172 is energized. Solenoid 172 actuates a means associated with cylinder 114 to retract piston 118 and rotate the index plate 110 from the dotted position to the position indicated in full lines in FIGURE 3. The index pin 128 causes receiver 10 through carrier plate 64 to rotate with index plate 110 and change the relative position of the chambers. The rotation of carrier plate 64 opens switch 160 and closes it after timer 210 has been reset. The rotation of carrier plate 64 closes switch 162 in circuit 188 to energize solenoid 138 in circuit 184. The switch 162 remains closed until the end of the time cycle and is then again opened by rotation of plate 64. Solenoid 138 (FIGURE 4) withdraws index pin 128 from aperture 124 in carrier plate 64. The delay action of solenoid switch 162 permits the piston 118 in cylinder 114 to extend and rotate index plate 110 to the dotted position indicated in FIGURE 3. The index plate 110 rotates relative to carrier plate 64 and the receiver 10 remains stationary while index plate 110 returns to its normal position. The rotation of index plate 110 and cam actuator 174 actuates switch 175 which deenergizes solenoid 138 in circuit 184 and index pin 128 then extends into newly aligned aperture 124 in carrier plate 64. Solenoid 150 is thereafter deenergized by the opening of switch 204 in circuit 180 and the wheel of lock cylinder 148 extends into the mating slot 146 in carrier plate 64 to fixedly secure the receiver 10 in its new position. In this manner the chambers 34, 36 and 38 are rotated relative to support 12.

Figure 8:
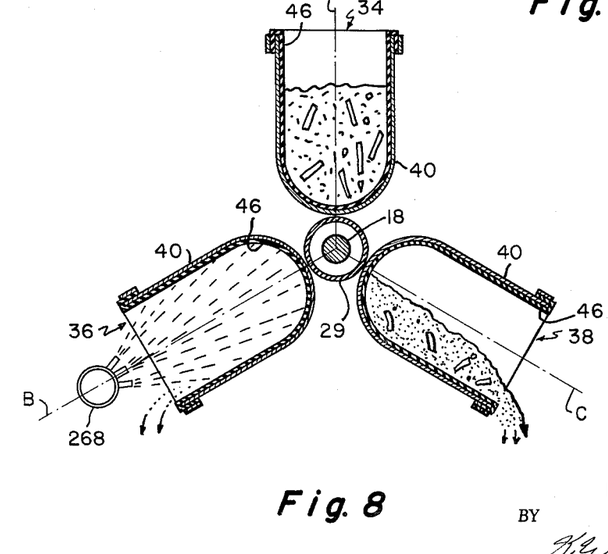
FIGURE 8 is a schematic illustration of the material receiver having three material receiving chambers and the relative position of the chambers.
Figure 9:
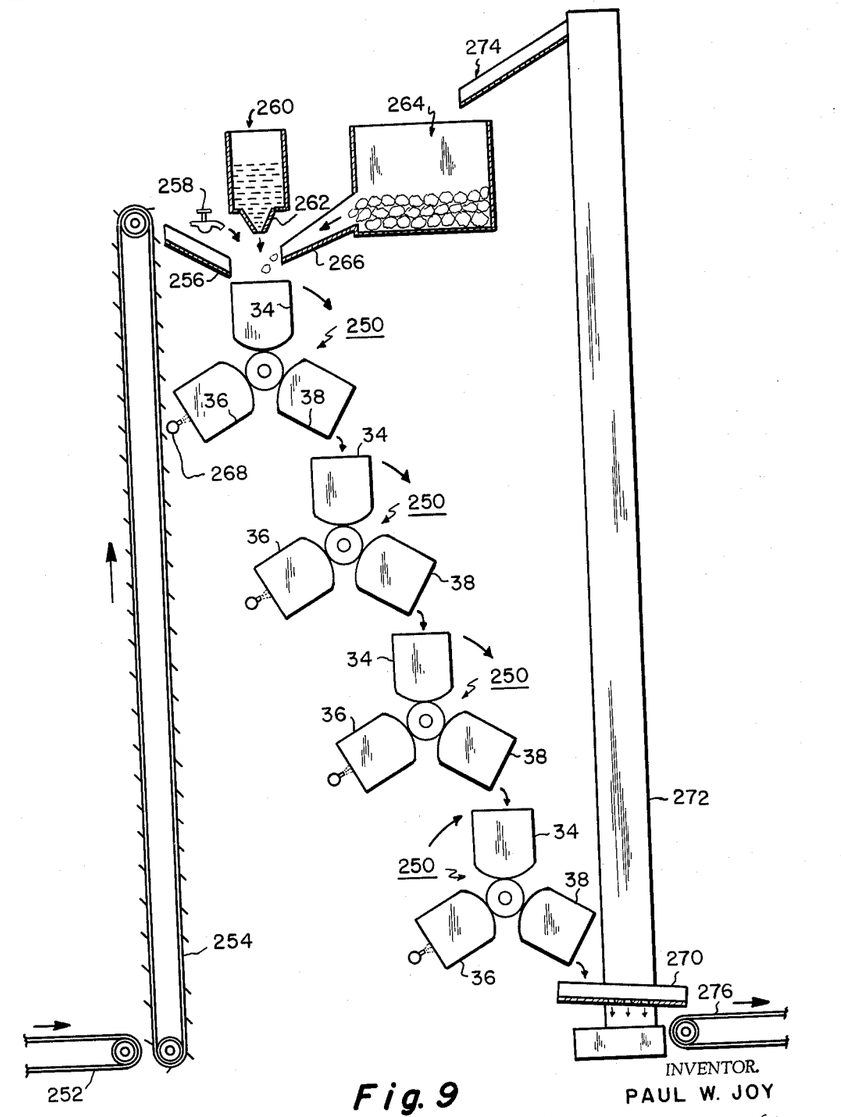
FIGURE 9 is a schematic illustration of one arrangement whereby my improved vibratory apparatus may be employed in a continuous finishing process.

FIGURES 8 and 9 illustrate a continuous multistep cleaning and polishing process. In FIGURE 9 a plurality of vibrators as previously described are positioned in cascading overlying relation to each other. The vibrators generally designated by the numeral 250 are so positioned that upon rotation of the receiver 10 relative to the stationary supports 12 (not shown in FIGURES 8 and 9) the respective chambers 34, 36 and 38 change position as previously described.

In FIGURE 9 there is illustrated a conveyor mechanism 252 which carries material to be treated to a vertical elevator 254. The material is discharged from vertical elevator 254 into a chute 256. The chute 256 is so arranged that material discharged therefrom enters chamber 34 of uppermost vibrator 250. Positioned above the chamber 34 is a source of liquid 258. In certain cleaning and polishing processes it is desirable to employ a liquid with the abrasive to thereby enhance the cleaning and polishing operation. A source of abrasive 260 is positioned above the chamber 34 and has spout means 262 that feeds the abrasive into the chamber 34 with the material to be cleaned or polished. A second source of abrasive 264 has a chute 266 which is arranged to feed the abrasive from source 264 into material receiving chamber 34. A source of cleaning fluid 268 utilized to wash the inner portion of the chamber is positioned adjacent chamber 36 as viewed in FIGURE 8 and FIGURE 9. Thus, while the material is being treated with abrasive in chamber 34, chamber 36 is being washed by means of the cleaning fluid from source 268. The vibrators 250 are so arranged that material discharged from chamber 38 in the uppermost vibrator 250 is discharged into chamber 34 of the vibrator 250 immediately therebelow. FIGURE 8 illustrates the material and abrasive being discharged from chamber 38. Thus, the material and abrasive may be subjected to a plurality of treatment steps at either different intensities of vibration or with different abrasives. FIGURE 9 illustrates the use of substantially the same abrasive throughout the entire process. It should be understood, however, additional abrasives could be introduced into the process at intermediate points if desired, thereby making possible in a continuous system various operations such as stock removal, deburring, burnishing, coloring, polishing, crushing, coating, etc. The material and abrasive is discharged from chamber 38 of lowermost vibrator 250 onto a screen 270. The abrasive passes through the apertures in the screen into an elevator mechanism 272 and is discharged from the upper portion of elevator 272 through chute 274 into the receiver for the second source of abrasive 264. The treated material passes over the screen 270 onto a conveying means 276. It will be readily apparent from the above description that with my improved vibratory apparatus it is now possible to subject material to a plurality of cleaning and polishing steps in a single, continuous operation instead of the batch type procedure previously employed.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. Vibratory apparatus comprising, a container for materials to be treated, said container having end walls and an open top portion, support means for said container having a pair of carrier members rotatably secured thereto and extending vertically therefrom in spaced relation to each other, said container positioned between said carrier members with said end walls adjacent to said respective carrier members, a shaft rotatably secured to said container, eccentric means associated with said shaft and operable upon rotation of said shaft to impart vibratory movement to said container, a plurality of resilient mounting means positioned between each of said carrier members and said container end walls thereby resiliently insulating said container and said shaft from said support means and suspending said container from said support means, said plurality of resilient mounting means between each container end wall and said adjacent carrier being arranged in radiosymmetric relation about the axis of said shaft, drive means to rotate said shaft and thereby impart substantially orbital movement to said container, and means to rotate said carriers relative to said support means to thereby change the position of said container relative to said support means from an upright load level position of use to a tilted position for load discharging.

2. Vibratory apparatus as set forth in claim 1 including means to nonrotatably secure one of said carrier members to said support means when said container is in an upright load level position.

3. Vibratory apparatus as set forth in claim 2 which includes means to limit the angle of rotation of said carrier relative to said support member from an upright load level position to a predetermined tilted position for load discharging.

4. Vibratory apparatus as set forth in claim 1 in which said eccentric means includes a pair of eccentric members nonrotatably secured to said first shaft, each of said eccentric members positioned between said respective carrier member and said respective container end wall.

5. Vibratory apparatus comprising an element to be vibrated, support means for said element, said element including a plurality of chambers for receiving material to be treated, said chambers extending radially from said element, a shaft rotatably secured to said element and extending longitudinally relative to said element, eccentric means associated with said shaft and operable upon rotation of said shaft to impart vibratory movement to said element, a plurality of resilient mounting means positioned between said element and said support means for resiliently mounting said element on said support means, said mounting means extending radially from said shaft and spaced circumferentially relative to said shaft, drive means to rotate said shaft and thereby impart substantially orbital vibratory movement to said element, and means to rotate said element relative to said supporting means to selectively position at least one of said chambers in an upright load level position.

6. Vibratory apparatus comprising, an element to be vibrated, support means for said element, said element including a plurality of chambers for receiving material to be treated, said chambers extending radially from said element, said element having end walls, said chambers having open top portions, a shaft rotatably secured to said element and extending longitudinally relative to said element, eccentric means associated with said shaft and operable upon rotation of said shaft to impart vibratory movement to said element, said support means for said element having a pair of carrier members rotatably secured thereto and extending vertically therefrom in spaced relation to each other, said element positioned between said carrier members, a plurality of resilient mounting means positioned between said element and each of said carrier members to thereby resiliently insulate said element and said shaft from said support means and suspend said element from said support means, said plurality of resilient mounting means between said element and said carriers being arranged in radiosymmetric relation about the axis of said shaft, drive means to rotate said shaft and thereby impart substantially orbital vibratory movement to said element, and means to rotate said carriers relative to said support means to thereby change the position of said element relative to said support means and change at least one of said chambers from an upright load level position of use to a tilted position for load discharging.

7. Vibratory apparatus as set forth in claim 6 including means to nonrotatably secure one of said carrier members to said support means when at least one of said chambers of said element is in an upright load level position.

8. Vibratory apparatus as set forth in claim 6 which includes means to limit the angle of rotation of said carrier relative to said support means to change the relative position of at least one of said chambers in said element from an upright load level position to a predetermined tilted position for load discharging.

9. Vibratory apparatus as set forth in claim 6 which includes stop means on said carrier to provide a load level upright position of use of at least one of said chambers of said element.

10. Vibratory apparatus as set forth in claim 6 in which said means to rotate said carriers relative to said support means includes an index plate positioned in parallel relation to one of said carriers, said index plate being rotatable relative to said carrier member and said support means, actuator means to rotate said index plate relative to said support means, and engaging means to engage said index plate to said carrier member for rotation therewith relative to said support means to thereby rotate said carrier and said element relative to said support means upon actuation of said actuator means.

11. Vibratory apparatus as set forth in claim 10 which includes locking means to nonrotatably secure said carrier member relative to said support means, and control means to disengage said locking means, engage said engaging means between said index plate and said carrier member, actuate said actuator means to rotate said element relative to said support means, lock said locking means, disengage said engaging means, and rotate said index plate relative to said carrier member.

References Cited by the Examiner

UNITED STATES PATENTS 2,230,325  2/41  Haver _______________ 259—72
2,757,544  8/56  Becker.

FOREIGN PATENTS 665,523  7/36  Germany.

LESTER M. SWINGLE, *Primary Examiner.*